United States Patent [19]

Sakata et al.

[11] 4,442,607
[45] Apr. 17, 1984

[54] MEASURING INSTRUMENT

[75] Inventors: Hideo Sakata; Masami Saito, both of Kawasaki, Japan

[73] Assignee: Mitutoyo Mfg. Co., Ltd., Tokyo, Japan

[21] Appl. No.: 441,965

[22] Filed: Nov. 15, 1982

[30] Foreign Application Priority Data

Nov. 25, 1981 [JP] Japan .................................. 56-188930
Nov. 25, 1981 [JP] Japan .................................. 56-188931

[51] Int. Cl.³ ............................ G01B 7/28; B23Q 3/02
[52] U.S. Cl. .................................. 33/1 M; 33/174 TA
[58] Field of Search ............ 33/1 M, 1 AA, 174 TA, 33/174 P

[56] References Cited

U.S. PATENT DOCUMENTS

| | | | |
|---|---|---|---|
| 3,774,311 | 11/1973 | Stemple | 33/1 M |
| 4,013,280 | 3/1977 | Chitayat et al. | 33/174 TA |
| 4,255,862 | 3/1981 | Nakamura | 33/1 M |
| 4,400,880 | 8/1983 | Nelle | 33/1 M |

Primary Examiner—Willis Little
Attorney, Agent, or Firm—Flynn, Thiel, Boutell & Tanis

[57] ABSTRACT

A measuring instrument wherein a measuring element support member having a measuring element is made movable relative to a workpiece to be measured rested on a bedplate.

This measuring instrument is provided with a rail support member which is secured in a recessed portion formed at the side surface of the bedplate through a bonding agent, a guide rail is mounted on the rail support member in predetermined position through a V-groove formed on rail support member and locking screws threadably coupled to the guide rail, and a movable member is slidably provided on the guide rail.

5 Claims, 7 Drawing Figures

MEASURING INSTRUMENT

BACKGROUND OF THE INVENTION

1. Field of the Invention

This invention relates to a measuring instrument wherein a movable member having a measuring element or the like is made movable relative to a workpiece to be measured rested on a bedplate, as in the two-dimensional measuring instrument, three-dimensional measuring instrument (coordinate measuring instrument), contour measuring instrument and strain measuring instrument or the like, and more particularly to improvement in a guide rail portions of the measuring instrument.

2. Description of the Prior Art

In general, in the above-described measuring instruments, a displacement of a measuring element has been detected as referenced from the upper surface of a bedplate, and hence, with the measuring instruments of the type, wherein only the measuring element is moved for measuring, it has been necessary to move a measuring element support member supporting the measuring element in parallel to the upper surface of the bedplate.

In view of the above, heretofore, guide rails finished with high accuracy have been directly affixed to the upper surface of the bedplate in parallel to each other by means of fittings for exclusive use and bolts. In consequence, there have been presented such disadvantages that a great amount of labor is needed for the installation of the guide rails, out of the area of the upper surface of the bedplate, an effective portion put to use for resting a workpiece is small, and a workpiece being heavy in weight cannot be parallelly moved from one side of the bedplate to be mounted thereon.

On the other hand, there are some cases where, for example, the guide rails are suspended from the ceiling of a house, or the guide rails are disposed on the ground through a bed in no connection with the bedplate. In this case, a great amount of labor is needed for obtaining parallelism between the upper surface of the bedplate and these guide rails, and moreover, anti-vibration measures for the guide rails must be taken, thus resulting in increased costs and lowered accuracy.

Further, in the above-described conventional constructions, since the guide rails are fixedly provided on the bedplate, there have been presented such disadvantages that, when the guide rails are to be replaced due to a damaged scale or the like, it is very troublesome to replace the guide rails with new ones, and the positioning of the guide rail is difficult, and hence, the maintenance of accuracy after the replacement is difficult. Further, in the conventional constructions, the positioning of the measuring element support member relative to the guide rails is difficult.

SUMMARY OF THE INVENTION

The present invention has as its object the provision of a measuring instrument wherein there is provided capable of readily obtaining parallelism with the upper surface of the bedplate with a little amount of labor, of being replaced with new one and of being easily positioned.

To achieve the above-described object, the present invention contemplates that a bedplate is provided with a recessed portion, into which a proximal end of a rail support member is solidly secured through a bonding agent, the forward end of this rail support member is formed with a positioning end face, a guide rail is detachably mounted on the forward end of the rail support member in such a manner that the guide rail is positioned by means of the positioning end face, and an eccentric positioning means is provided for pressing the guide rail against the positioning end face of the rail support member in mounting of the guide rail to the rail support member, between the rail support member and the guide rail, whereby the parallelism of the guide rail to the upper surface of the bedplate is obtained in bonding of the rail support member, so that the detachable guide rail is easily positioned by use of the positioning end face.

DETAILED DESCRIPTION OF THE PREFERRED EMBODIMENTS

Description will hereunder be given of one embodiment, in which the present invention is applied to a coordinate measuring instrument, with reference to drawings.

Figure 1:
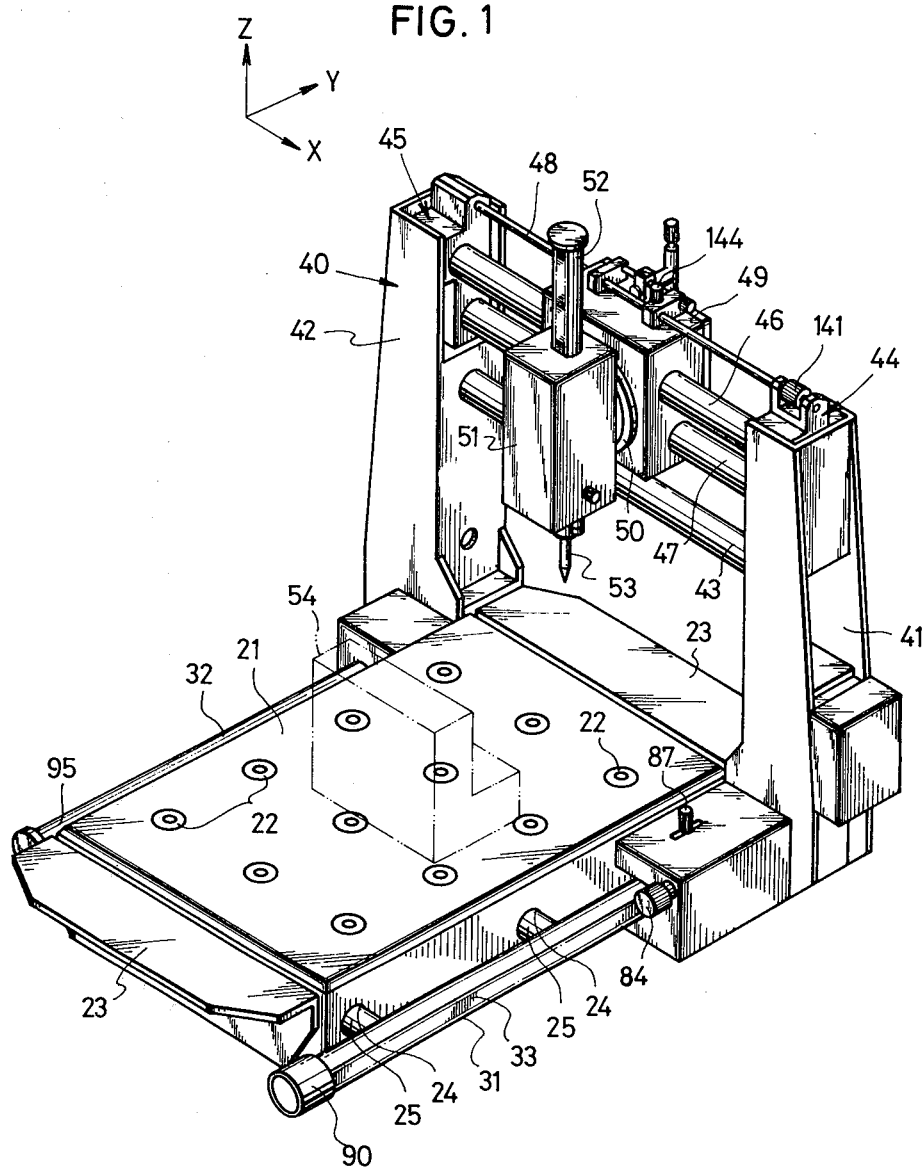
FIG. 1 is perspective view showing one embodiment in which the present invention is applied to a coordinate measuring instrument.

In a general arrangement view shown in FIG. 1, a bedplate 21 formed of a stone surface plate of substantially a rectangular parallelepiped is formed at the upper surface thereof with a plurality of threaded holes 22 for mounting a workpiece to be measured and further provided at front and rear end faces perpendicularly intersecting the longitudinal direction thereof with handgrips 23 of L-shape in cross-section, respectively. This bedplate 21 is detachably provided at opposite side surfaces thereof with guide rails 31 and 32, respectively, constituting guiding portions in directions of the Y axis. These guide rails 31 and 32 are longer than the length in the longitudinal direction of the bedplate 21, disposed below the upper surface of the bedplate 21 and in parallel therewith, and projected from the side surfaces of the bedplate 21. In this case, the provision of the guide rails 31 and 32 below the upper surface of the bedplate 21 means that the top surfaces of the guide rails 31 and 32 are flush with or lower than the upper surface of the bedplate 21. Furthermore, both the guide rails 31 and 32 are each formed such that opposite sides of a column are ground away in parallel to each other and the shape of a cross-section of the column perpendicularly intersecting the longitudinal direction of the column is formed into substantially an oval shape consisting of circular arcuate portions and rectilinear portions (Refer to FIG. 2). Further, one of the guide rails, i.e., the guide rail 31 shown in front in FIG. 1 is adhesively attached at the outer side surface thereof with a long scale 33 to be described in detail hereunder.

Prismatic supports 41 and 42 are supported by the guide rails 31 and 32 disposed at the opposite sides in a manner to be movable in the longitudinal direction (direction of the Y axis) of the guide rails 31 and 32, respectively. Racked across the intermediate portions of these supports 41 and 42 disposed at the opposite sides is a transverse member 43 formed of a round rod for setting an interval across the both supports 41 and 42 in the direction of the X axis to a predetermined value. Further, racked across the upper end portions of the both supports 41 and 42 through connecting portions 44 and 45, respectively, are slider guide rails 46 and 47 formed of round rods and a slider fine feed rail 48 formed of a round rod in a manner to perpendicularly intersect the aforesaid guide rails 31 and 32 and be in a direction parallel to the upper surface of the bedplate 21, i.e., the direction of the X axis. A box-shaped slider 49 is supported on these slider guide rails 46 and 47 in a manner to be movable in the direction of the X axis along the slider guide rails 46 and 47. A box-shaped spindle support member 51 is supported on this slider 49 through angle measuring means 50 in a manner to be tiltable about the Y axis. A spindle 52 is supported on this spindle support member 51 in a manner to be slidable in a direction of the center axis thereof. The spindle 52 is secured at the lower end thereof with a measuring element 53. In this case, the spindle 52 is set to be movable in a direction of the axis Z (vertical direction) when the inclination of the spindle support member 51 is zero, whereby the measuring element 53 is desirably movable relative to the bedplate 21 and a workpiece to be measured, which has been mounted on this bedplate 21, in the directions of the X, Y and Z axes perpendicularly intersecting one another in accordance with the movement of the slider 49 in the direction of the X axis and the movements of the supports 41 and 42 in the direction of the Y axis. Furthermore, a measuring element support member 40 as being a movable member is constituted by the supports 41 and 42, the transverse member 43, the connecting portions 44 and 45, the slider guide rails 46 and 47, the slider 49, the angle measuring means 50, the spindle support member 51 and the spindle 52.

The fine feed rail 48 racked across the upper portions of the connecting members 44, 45 and the slider 49 are slidable with each other in the normal condition, and unslidably secured by clamping of a clamp screw 144. In this fixed condition, when an adjusting nut 141 threadably coupled to the fine feed rail 48 is rotated, the slider 49 can be finely fed along the axial direction of the guide rails 46 and 47 through the fine feed rail 48.

Designated at numeral 84 in FIG. 1 is a finger grip for fine feeding of the measuring element support member 40, 87 a knob for operating or releasing of the fine feeding, 90 shock absorbers provided on the opposite ends of the guide rail 31, and 95 stoppers provided on the opposite ends of the guide rail 32.

Figure 2:
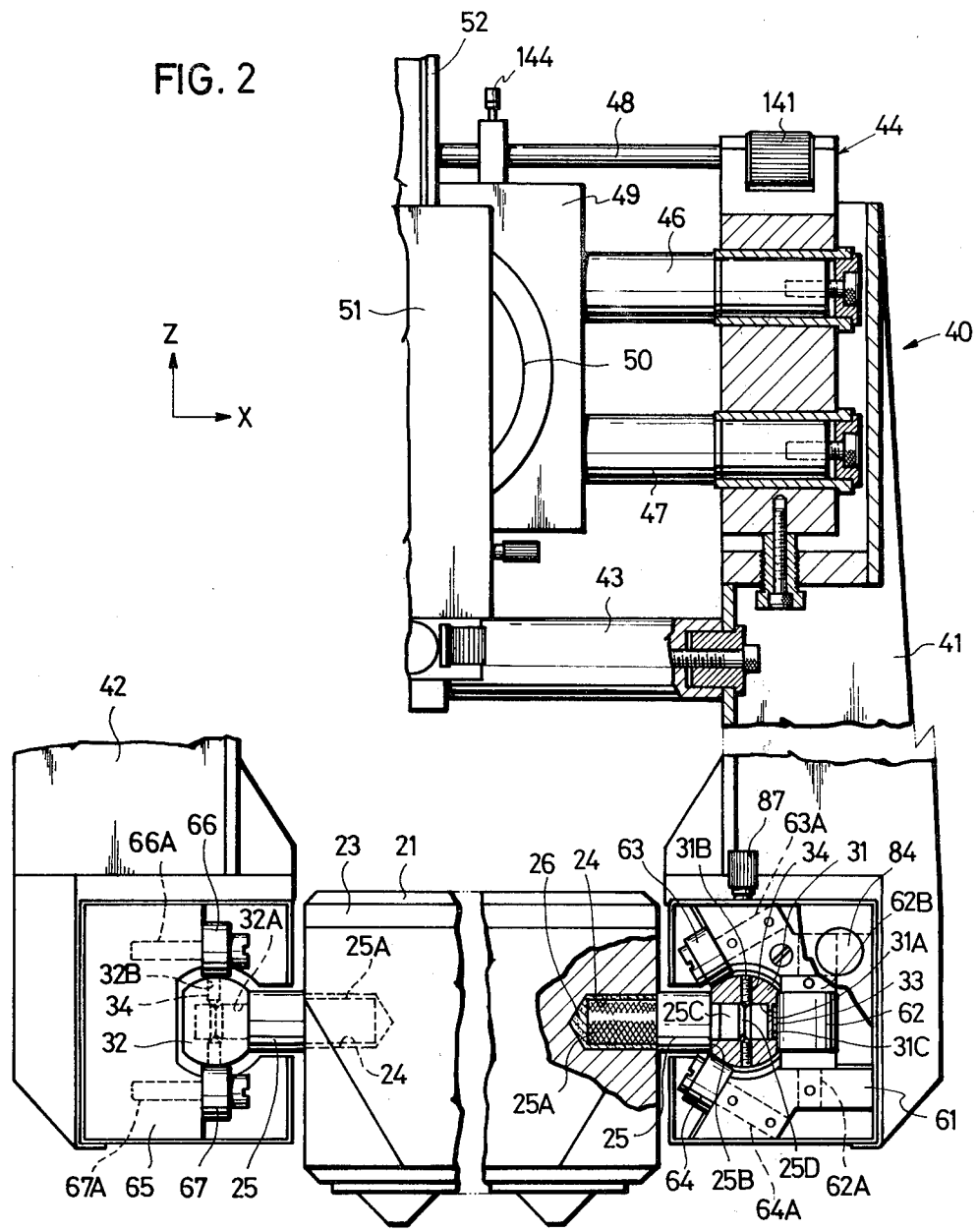
FIG. 2 is an enlarged front view, partially cut away, of the essential portions thereof.

In FIG. 2, i.e., the sectional views enlargedly showing the essential portions of the present embodiment, formed in series on the opposite side surfaces of the bedplate 21 in the direction of the Y axis are a plurality of holes 24 as being a recessed portion, into which small diameter portions 25A formed at proximal end portions of support stems 25 constituting a rail support member are bonded and solidly secured through a bonding agent 26 (Refer to FIG. 2). In this case, irregularities are formed by means of double-cut knurling on the outer peripheries of the small diameter portions 25A, so that the bond strength can be improved. Furthermore, each of the support stems 25 is integrally formed at the forward end thereof with a small diameter projection 25C through a stepped portion 25B constituting a positioning end fase. A V-groove 25D is formed around the entire periphery of the intermediate portion of this projection 25C.

Recesses 31A and 32A engageable with the projections 25C of the support stems 25 are formed on the inner side surfaces of the both guide rails 31 and 32 at positions respectively opposed to the plurality of support stems 25 projected from the opposite side surfaces of said bedplate 21. Pairs of threaded holes 31B and 32B penetrating to these recesses 31A and 32A are formed from the circular arcuate surfaces of the guide rails 31 and 32 being oval in cross-section at positions respectively opposed to the recesses 31A and 32A, and locking screws 34 having tapered forward end portions are threadably coupled into these threaded holes 31B and 32B, respectively. In this case, the center line of the V-groove 25D and the center axis of the locking screw 34 are shifted in position from each other, and the direction of shifting in position is such that the center line of the locking screw 34 is shifted toward the side of the forward end of the projection 25C from the center line of the V-groove 25D, whereby, when the tapered surfaces formed at the forward end portions of the locking screws 34 abut against the wall surfaces of the V-grooves 25D, the end faces of the stepped portions 25B of the support stems 25 are pressed against rectilinear portions in the cross-sections of the respective guide rails 31 and 32, so that control can be effected on mounting positions between the guide rails 31, 32 and the support stems 25. Here, the V-groove 25D and the locking screws 34 constitute an eccentric positioning means. Additionally, when the both guide rails 31 and 32 are bonded and solidly secured to the bedplate 21 through the support stems 25, the bonding is effected by use of a positioning jig 400, to be described hereinafter (Refer to FIG. 4), whereby the respective guide rails 31 and 32 are affixed to the upper surface of the bedplate 21 in parallel thereto with high accuracy, and particularly, the guide rail 31 is adapted to have an accuracy sufficient to serve as a positional reference for the measuring instrument.

A groove 31C is formed on the outer side surface of one of the both guide rails 31 and 32, i.e., the guide rail 31 over the total length, and this groove 31C is in parallel to the center axis of the rail 31 and the bottom surface of the groove 31C is finished with high accuracy by way of simultaneously polishing so as to be in parallel to the outer side surface of the rail 31. The aforesaid scale 33 is adhesively attached into this groove 31C, and, for example, this scale 33 may be formed of a reflection type scale wherein a longitudinal graduation of $\mu$m order is formed on the surface of a stainless steel sheet.

An engageable block 61 is affixed to the lower portion of one 41 of the supports. Roller groups each consisting of three rollers 62, 63 and 64 are respectively provided at longitudinally (direction of the Y axis) opposite end portions of this block 61. Directions of the normal lines to the peripheral surfaces of these rollers 62, 63 and 64 are varied from one another through 120°, and the bush 62B to be coupled onto a pivot 62A of the roller 62 and the coupled portions of the rollers 63 and 64 on pivots 63A and 64A are shifted by predetermined values from the center line of the pivots, respectively, whereby the directions of the normal lines to the peripheral surfaces of the rollers 62, 63 and 64 are adjustable, so that the rollers 62, 63 and 64 can reliably be in abutting contact with the guide rail 31. Furthermore, out of the rollers 62, 63 and 64, the roller 62 is formed to have a comparatively large width because this roller comes into abutting contact with the rectilinear portion in the cross-section of the rail 31, and other rollers 63 and 64 are formed to have a small width because these rollers comes into abutting contact with circular arcuate portions of the rail 31. Further, the guide rail 31 is in abutting contact with the three rollers 62, 63 and 64 at three points respectively varied in angle through 120°, so that the block 61, i.e., the support 41 cannot move in the directions of the X and Z axes.

Figure 3:
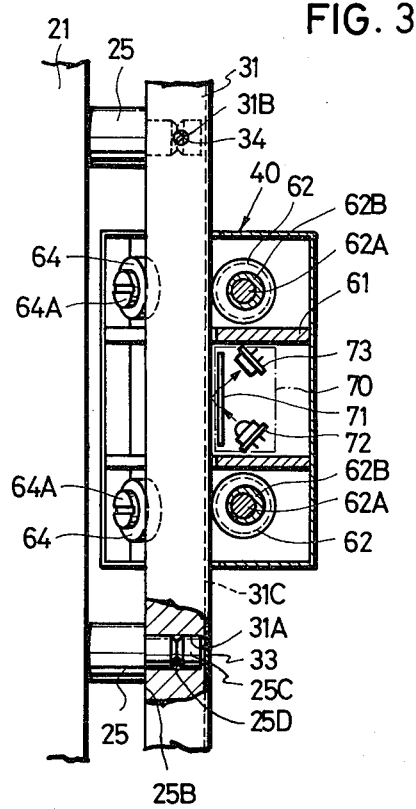
FIG. 3 is a sectional view showing the schematic arrangement in the engageable block.

As shown in the schematic arrangement of FIG. 3, the engageable block 61 is provided with a measuring unit 70 as being a Y axis direction displacement detector, constituting Y direction measuring means to measure a movement value of the measuring element support member 40 in the direction of the Y axis, in cooperation with the aforesaid scale 33. This measuring unit 70 includes: an index scale 71 wherein a graduation similar to that as in the aforesaid scale 33 is formed on a transparent sheet made of glass or the like; a light emitting element 72 as being a light source for sending a light to the surface of the scale 33 through this index scale 71; and a light receiving element 73 as being a receptor for receiving the light emitted from this light emitting element 72 and reflected from the scale 33. The measuring unit 70 can measure a movement value of the support member 40 in the direction of the Y axis through a sine wave-shaped current generated in the light receiving element 73 through a change in the value of the received light by brightness or darkness of both graduations 33 and 71 due to a relative movement between the both scales 33 and 71. In this case, the optical axes of the light emitting element 72 and the light receiving element 73 are arranged in a V-shape, whereby the light emitted from the light emitting element 72 is reflected at the scale 33 and reliably reaches the light receiving element 73.

An engageable block 65 is affixed to the lower portion of the other support 42 (Refer to FIG. 2), roller groups each consisting of two rollers 66 and 67 are respectively provided at longitudinally (direction of the Y axis) opposite end portions of this block 65. These rollers 66 and 67 are disposed on the peripheral surface of the rail 32 through 180° with one another, and the coupled portions of the rollers 66 and 67 on pivots 66A and 67A are shifted by predetermined values from the center line of the pivots, respectively, whereby the positions of the directions of the normal lines to the peripheral surfaces of the rollers 66 and 67 are made adjustable so that the rollers 66 and 67 can reliably be in abutting contact with the guide rail 32. In this case, the guide rail 32 is in abutting contact with the both rollers 66 and 67 at two points respectively varied in angle through 180°, so that the both rollers 66 and 67, i.e., the support 42 can move in the axial direction of the support stem 25 (direction of the X axis).

Figure 4:
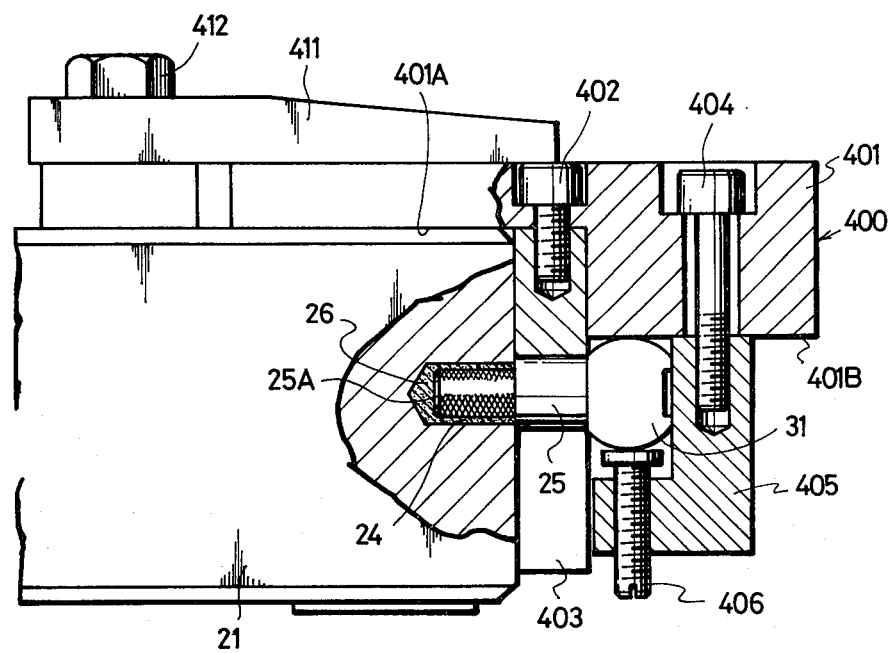
FIG. 4 is a partially sectional front view showing an example of the jig used in the present embodiment.

Description will hereunder be given of method of assembling the guide rails and the rollers with reference to FIG. 4.

Projections 25C of the support stems 25 as being a rail support member are inserted into a plurality of hole-like recesses 31A and 32A formed in the guide rails 31 and 32, and locking screws 34 are threadably coupled into threaded holes 31B and 32B of the guide rails 31 and 32 and the forward ends of the screws 34 are engaged with V-grooves 25D of the support stems 25, whereby end faces of stepped portions 25B of the support stems 25 are moved to abut against the rectilinear portions in cross section of the guide rails 31 and 32 owing to shifts between the center axes of the locking screws 34 and the centers of the V-grooves 25D, so that the positioning between the guide rails 31, 32 and the support stems 25 can be performed due to the aforesaid abutments.

Subsequently, small diameter proximal end portions 25A of the support stems 25 are inserted into holes 24 of the bedplate 21 in conditions where bonding agents 26 are interposed therebetween, and positioning is performed by use of a jig 400 shown in FIG. 4 such that the axes of the guide rails 31 and 32 come to be in parallel to the upper surface of the bedplate 21, and the bonding agents 26 are allowed to be solidified. More specifically, the jig 400 comprises: a base 401 formed with a first and a second surfaces 401A and 401B precisely brought into parallel to each other and having a step of a predetermined distance; a spacer 403 affixed to a stepped portion of this base 401 through a bolt 402, having a comb-shape so as to be relieved from portions of the support stems 25, and determining the dimension between the side surface of the bedplate 21 and the inner rectilinear portion in cross section of the guide rail 31; an L-bracket 405 secured to the second surface 401B of the base 401 through a bolt 404 in a manner to be adjustable in the lateral direction, being abutted against the outer rectilinear portion in cross section of the guide rail 31 to press the guide rail 31 against the spacer 403; and a plurality of pressing screws 406 linearly movably, threadably coupled into the L-bracket 405 and pressing by their own inner ends the guide rail 406 against the second surface 401B to determine the dimension. This jig 400 is mounted to the bedplate 21 through a retainer brace 411 and a bolt 412, and the upper surface of the guide rail 31, i.e., the axis is brought into parallel to the upper surface of the bedplate 21 through the agency of the first and the second surfaces 401A and 401B of the base 401. The other guide rail 32 is fixed by a jig similar to the above, however, in this case, the parallelism between the guide rail 31 and the other guide rail 32 does not count.

After the bonding agents 26 have been solidified, the measuring element support member 40 is assembled to the both guide rails 31 and 32. Since this assembling is referenced from the guide rail 31, firstly, adjustments are made by use of eccentric bush 62B and eccentric shafts 63A, 64A of the rollers 62, 63 and 64 on the side of the support 41 can properly abut against this guide rail 31. With this arrangement, the measuring support member 40 is assembled as referenced from the guide rail 31. Subsequently, adjustments are made similarly so that the rollers 66 and 67 of the support 42 can properly abut against the guide rail 32, thus enabling to complete the assembling as a whole. In this case, the rollers 66 and 67 of the support 42 are abutted against the guide rail 32 from above and below, and hence, movable in the axial direction of the rail support stem 25. In consequence, both the supports 41 and 42, which have been determined by transverse member 43 in dimension, are supported by the both guide rails 31 and 32 in a manner to hold the interval thus determined in dimension.

The present embodiment described above can offer the following advantages.

Namely, the engageable block 61 and the guide rail 31 are secured to each other without being shifted in position by means of three rollers 62, 63 and 64 including the roller 62 abutted against the rectilinear portion in cross section of the guide rail 31, and hence, if, previously, the scale 33 is secured to the guide rail 31 and the measuring unit 70 is secured to the engageable block 61, then the scale 33 and the index scale 71 of the measuring unit 70 can keep a clearance of a predetermined value therebetween at all times without needing to use complicated fixtures, rotation preventing means and the like. After the support stems 25 have been affixed to the bedplate 21, even if the screw 34 is loosened and the guide rails 31 and 32 are replaced, the guide rails 31 and 32 can be set at the same positions as before with respect to the bedplate 21, whereby the scale 33 and the like are readily replaceable and necessity for the subsequent adjustment can be eliminated in case the scale 33 is damaged. Further, the surface, on which the rollers 62 are engaged with the guide rail 31, and the groove 31C for mounting the scale 33 are precision-finished with high accuracy, whereby only applying of the scale 33 into the groove 31C enables the surface, on which the rollers 62 are engaged with the guide rail 31, in turn, the index scale 71 and the scale 33 to be kept in parallel to each other, and there are little occurrences of warps, distortions and the like of the scale 33 with respect to the moving direction of the engageable block 61, so that necessity for adjustments can be eliminated, thereby enabling to reduce the number of man-hour in assembling to a considerable extent. Since the guide rail 31 additionally serves as the fixed block for the scale 33, whereby no special fixture and the like are needed, thus enabling to manufacture at low costs.

Further, the guide rails 31 and 32 are bonded and affixed to the bedplate 21 through the support stems 25, and hence, an accurate parallelism between the guide rails 31, 32 and the upper surface of the bedplate 21 can be readily obtained, and, even of support points, i.e., the support stems 25 are increased in number to prevent the guide rails 31 and 32 from being deflected, errors in mounting the support stems 25 to the guide rails 31 and 32 are entirely absorbed by the portion of the bonding agent 26, whereby no stress occurs in the guide rails 31 and 32. Furthermore, in the guide rail 31, since the rollers 63 and 64 arranged at the side of the bedplate 21 are inclinedly mounted by use of the circular portion of the guide rail 31, spaces which would otherwise be provided between the guide rail 31 and the bedplate owing to the interposition of the rollers 63 and 64 can be reduced, whereby the projection values of the support stems 25 projecting from the side surfaces of the bedplate 21 can be reduced, thus enabling to offer the advantage in the contilever supporting shapes. Further, the positioning control of the measuring element support member 40 can be effected by only one guide rail 31, so that the construction of engagement between the other guide rail 32 and the measuring element support member 40 can be simplified. Moreover, the accuracy need not be made strict, so that the manufacturing cost may be reduced from the point described above.

In addition, since the guide rails 31 and 32 are provided at the side of the bedplate 21, the upper surface of the bedplate 21 as a whole can be effectively utilized and transportation of the workpiece 54 from the side of the bedplate 21 can be performed. Further, the opposing guide rails 31 and 32 are larger in length than the bedplate 21, whereby the measuring element support member 40 is moved to the extended portions of the guide rails 31 and 32, so that the mounting and the measuring of the larger workpiece 54 can be performed.

Further, while the engageable block 61 is controlled in positioning in the directions of the X and Z axes by use of only one guide rail 31, the engageable block 61 can be guided in the direction of the Y axis, and moreover, the engageable block 61 can be controlled in positioning in the rotating direction as well.

Figure 5:
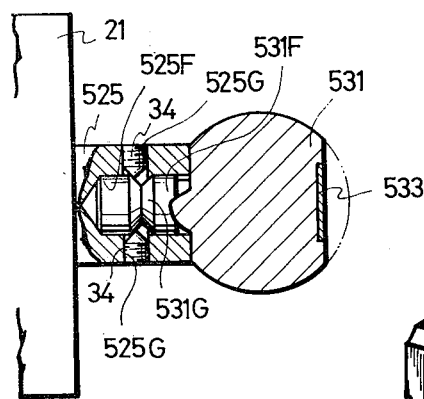
FIG. 5 is a sectional view of the essential portions showing another embodiment of the present invention.

FIG. 5 shows another embodiment of the present invention. In this embodiment, a projection 531F is provided on the guide rail 531, a V-groove 531G is provided on this projection 531F, while, a recess 525F engageable with the projection 531F is formed on the support stem 525, a threaded hole 525G extending to this recess 525F is formed in the vertical direction, the center axis of the threaded hole 525G and the center of the V-groove 531G are shifted from each other when the projection 531F is engaged with the recess 525F, and the end face of the support stem 525 and the rectilinear portion in cross section of the guide rail 531 are abutted against each other.

Even the present embodiment with the above-described arrangement has the functional effects similar to the preceding embodiment.

Figure 6:
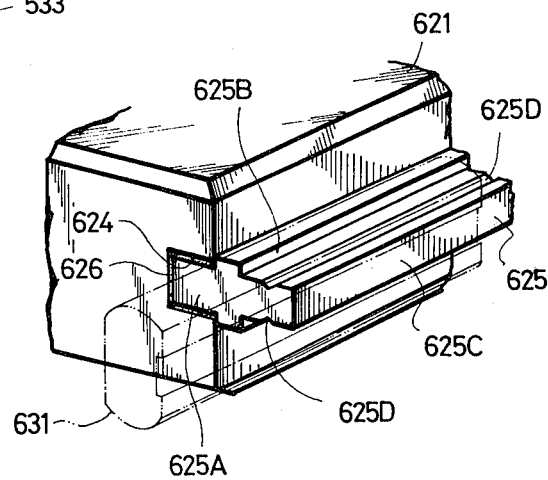
FIG. 6 is a perspective view of the essential portions showing a further embodiment of the present invention.

FIG. 6 shows a further embodiment of the present invention. In this embodiment, a rail-shaped support member 625 but not the shaft-shaped member is used as the rail support member, a small width portion 625A is formed at the proximal end of this support member 625, and this small width portion 625A is inserted and affixed through a bonding agent 626 into a groove 621A formed at one side surface of a bedplate 621. A prismatic ridge 625C is integrally formed through a stepped portion 625B on the forward end of the support member 625, and V-grooves 625D are formed on the upper and lower surfaces of this ridge 625C. A guide rail 631, being positioned through the agency of the V-groove 625D and a locking screw, not shown, is detachably secured to the ridge 625C in the same manner as in the preceding embodiments.

Even the present embodiment with the above-described arrangement has the functional effects similar to the preceding embodiments.

Figure 7:
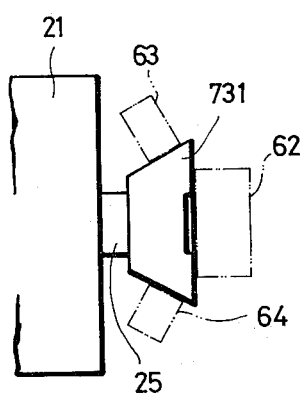
FIG. 7 is a front view of the essential portions showing a still further embodiment of the present invention.

FIG. 7 shows a still further embodiment of the present invention. In this embodiment, the guide rail 731 is formed into a trapezoidal shape in cross section, eliminating the circular arcuate portions, other respects in construction are similar to those in the embodiment shown in FIG. 1, and also, the function and effects are similar thereto.

Further, in the preceding embodiment, the measuring element 53 having a contact type construction has been illustrated, however, the measuring element according to the present invention need not necessarily be limited to this specific form, but, may be replaced by those including one using a electrostatic capacity, or a so-called non-contact type one such as a laser measuring instrument for length. The both guide rails 31 and 32 in the first embodiment need not necessarily be limited to the specific form in which the rails are provided at the sides of the bedplate 21 and downwardly of the bedplate 21. For example, the rails may be provided on the upper surface of the bedplate 21 directly or through a seat plate, and otherwise, no rail is provided at the side where there has been provided a rail being not referenced from, and the upper surface of the bedplate itself may be used for guiding. In short, it suffices that a guide rail, which can be referenced from, is provided at one side of the bedplate 21. Further, the present invention need not necessarily be limited to the coordinate measuring instrument, but, may be applied to measuring instruments, which have a measuring element, including a two-dimensional measuring instrument and a contour measuring instrument, or measuring instruments having microscope in place of the measuring element. Further, the scale 33 need not necessarily be limited to the optical reflection type scale, but, may be replaced by a light transmission type scale, an electromagnetic scale, a magnetic scale, an electrostatic capacity type scale and a contact point scale. Furthermore, in the preceding embodiments, description has been presented that, as for the guide rails 31 and 32, one guide rail at each side has been provided, however, two or more guide rails may be provided at one side, and one of these guide rails 31 and 32 may be used as a reference, and the other used to bear the load of the measuring element support member 40. With the above-described arrangement, the accuracy in the measurement can be maintained for a long period of time. Further, the shapes of the guide rails 31, 531, 631 and 731 need not necessarily be limited to ones having rectilinear portions in cross section (planar portion) at the opposite sides thereof, but, may be replaced by one having no rectilinear portion in cross section on the right side as indicated by two-dot chain lines in the right of FIG. 4, that is, it suffices that at least one side has a rectilinear portion being abutted against the stepped portion 25B of the rail support member. However, the provision of two rectilinear portions makes it possible to conveniently use them as one for guiding the rollers, another for a reference in applying a scale and so forth.

As has been described hereinabove, the present invention can provide a measuring instrument capable of obtaining parallelism between the upper surface of the bedplate and the guide rails with ease, of easily replacing the guide rails, and of easily positioning of the guide rails when the guide rails are replaced.

What is claimed is:

1. A measuring instrument comprising:
    a bedplate supporting a workpiece to be measured, and provided at a side surface thereof with a recessed portion;
    a rail support member bonded at proximal end thereof to said recessed portion through a bonding agent, and provided at the forward end thereof with a positioning end face;
    guide rails detacheably mounted at the forward end of said rail support member, and positioned by said positioning end face;
    an eccentric positioning means provided between the rail support member and the guide rail and pressing the guide rail against the positioning end face of the rail support member in mounting the guide rail to the rail support member;
    a movable member movably supported on said guide rail; and
    a displacement detector for detecting a displacement of said movable member.

2. A measuring instrument as set forth in claim 1, wherein said eccentric positioning means comprises: a V-groove provided on either the rail support member or the guide rail, and locking screws threadably coupled in either the rail support member of the guide rail in a position where coupling position of the locking screws is shifted from the center of the V-groove.

3. A measuring instrument as set forth in claim 1, wherein said rail support member is formed with irregularlities for increasing bonding strength on the periphery of the proximal end of the rail support member.

4. A measuring instrument as set forth in claim 1, wherein said guide rail is formed with circular arcuate portions and rectilinear portions parallel to each other in the cross section thereof perpendicularly intersecting the axial direction of the guide rail.

5. A measuring instrument as set forth in claim 1, wherein said bedplate is formed of a stone surface plate of substantially a rectangular parallelepiped.

* * * * *